United States Patent [19]

Yasui et al.

[11] Patent Number: 4,767,803
[45] Date of Patent: Aug. 30, 1988

[54] METHOD OF PRODUCING COAGULATED COLLOIDAL PARTICLES

[75] Inventors: Hideo Yasui, Kobe; Yasuhiro Miki, Himeji; Wataru Okada, Kobe, all of Japan

[73] Assignee: Kanegafuchi Kagaku Kogyo Kabushiki Kaisha, Osaka, Japan

[21] Appl. No.: 881,294

[22] Filed: Jul. 2, 1986

[30] Foreign Application Priority Data

Jul. 3, 1985 [JP] Japan ............................ 60-147316
Jul. 3, 1985 [JP] Japan ............................ 60-147317

[51] Int. Cl.$^4$ .......................... C08J 3/02; C08J 3/16
[52] U.S. Cl. .................................. 523/335; 523/352; 528/502; 528/936; 525/78; 525/80; 525/84; 525/86; 525/243; 525/301; 525/309; 525/310; 526/201; 210/723
[58] Field of Search .............. 523/352, 313, 335; 528/490, 502, 936, 499; 210/723; 525/78, 80, 84, 86, 243, 301, 309, 310; 526/201

[56] References Cited

U.S. PATENT DOCUMENTS

| | | | |
|---|---|---|---|
| 2,408,128 | 9/1946 | Squires, Jr. et al. | 528/502 X |
| 2,556,260 | 6/1951 | Downing | 528/502 X |
| 2,588,948 | 3/1952 | Westfahl | 528/936 X |
| 4,031,302 | 6/1977 | Shimizu et al. | 528/936 X |
| 4,213,888 | 7/1980 | Karg et al. | 528/483 X |
| 4,383,108 | 5/1983 | Jorgensen, Jr. | 528/485 |
| 4,401,806 | 8/1983 | Hagiwara et al. | 528/498 |
| 4,446,309 | 5/1984 | Jiroumaru et al. | 523/352 X |
| 4,623,678 | 11/1986 | Moore et al. | 523/352 X |

*Primary Examiner*—Joseph L. Schofer
*Assistant Examiner*—F. M. Teskin
*Attorney, Agent, or Firm*—Armstrong, Nikaido, Marmelstein & Kubovcik

[57] ABSTRACT

Disclosed is a method of producing coagulated colloidal particles with close-packed structure which comprises;
(A) adding a coagulant to aqueous colloidal particles at a temperature lower than softening temperature of the colloidal particles under such conditions that said coagulant will be present in discrete units in the dispersion before it is brought into solution by diffusion;
(B) allowing the molecules of coagulant to gradually diffuse from said coagulant units into the surrounding dispersion, thereby coagulating the colloidal particles on the surface of each coagulant unit, causing the coagulated particles to grow from inside to outside of each unit, and producing coagulated particles of desired size with regularly packed structure;
(C) separating the coagulated particles thus formed from the dispersion; and
(D) drying, or heating in an aqueous phase, the coagulated particles separated above at a temperature lower than the softening point of said colloidal particles.

11 Claims, No Drawings

METHOD OF PRODUCING COAGULATED COLLOIDAL PARTICLES

BACKGROUND OF THE INVENTION

1. Field of the Invention

This invention relates to a method of producing coagulated colloidal particles with close-packed structure by flocculating or coagulating aqueous colloidal particles to form particles with regularly packed structure and recovering the particles thus separated from the colloidal dispersion.

Aqueous colloidal particles herein means dispersion systems comprising water as dispersion medium and solid or gel particles, 10 to 3000 Å in size, as disperse phase, said disperse phase being electrically charged, suspended in said aqueous dispersion medium, and capable of being flocculated or coagulated by addition of a coagulant. It goes without saying that polymer latexes obtained by emulsion polymerization or other methods fall under this category.

2. Description of the Prior Art

To recover the solid or gel particles from such aqueous colloidal dispersions, both natural and synthetic, it is common practice that the primary particles, which are extremely minute in size, are first collected into a mass and the agglomerate thus formed is recovered, purified and dried. This technique is widely used for a variety of colloidal dispersions, but often meets with difficulties when applied to polymer (synthetic resin) latexes (most popular aqueous colloidal particles) because of the low softening point of disperse phase.

Recovery of a resinous polymer from a latex containing the same is generally effected by adding an aqueous solution of coagulant, such as inorganic salts or acids, to the latex (or adding the latex to the aqueous solution of coagulant), to cause coagulation, thus forming a slurry by heating or other suitable treatment, dewatering and drying the resulting slurry, and collecting the coagulated particles in the form of powder. This method, however, has the disadvantages that the powder obtained is irregular in shape, its particle size is difficult to control, particle size distribution is broad, and a considerable quantity of fine powder is contained. The result is airborne loss of the product, frequent troubles encountered during manufacturing due to clogging with fine powder, adversely affected working conditions due to dust formation, increased risk of dust explosion, and others. In addition, it is hardly possible to produce powder of high bulk density, resulting in higher transportation costs and larger warehouse expenses; and high-cost dewatering and drying facilities are required because of the poor dewatering, drying, flowing and anti-blocking properties of the powder obtained.

Tremendous efforts have been devoted to overcome these difficulties in the synthetic resin manufacturing industry, and many techniques have been proposed. These include a method of recovering the polymer in the form of spherical particles by spraying a polymer latex into a coagulatory atmosphere, and a method of absorbing coagulated particles by an organic solvent dispersed in water, followed by removal of the solvent to cause solidification of the particles. Behind these efforts to develop new methods for recovering polymers from their latexes, there is the current tendency that the value of a polymer product tends to be dictated by the particle size and its distribution, packing rate and related powder characteristics, rather than by the basic properties of that polymer.

The former method mentioned above has the disadvantages that it is difficult to produce, on an industrial basis, particles larger than 500 μm in size and that particles of close-packed structure can hardly be obtained. The latter method also involves various problems in terms of cost, quality, scope of application and powder characteristics. These include the difficulty in removing solvent and foreign matters and in achieving particles of close-packed structure, and the difficulty, for some types of polymers, in finding a solvent that can be used in such a special system.

Spray drying and vacuum agglomerate drying are known as a means to obtain solid polymer particles by direct drying of latices, and many modifications and improvements of equipment have been proposed. The disadvantages of these methods are that components other than the polymer contained in the latex can hardly be removed, that large equipment is required for production of large particles, and that a vast quantity of energy is necessary for treatment of low-concentration latices. This means limited use of these methods in terms of product quality and manufacturing cost. What is common to all these conventional techniques is difficulty in removing impurities and the problem of poor quality of emulsion polymers is left still unsolved.

SUMMARY OF THE INVENTION

One object of this invention is to provide a method of producing high-purity polymer particles containing less amounts of water-soluble and oil-soluble impurities (e.g., inorganic salts, organic additives and residual monomers).

A further object of this invention is to provide a method of producing polymer particles which can be rapidly dissolved or dispersed in water or in an organic solvent to form a clear solution or a homogeneous dispersion of fine particles.

Another object of this invention is to provide a method of producing polymer particles which undergo little change in state, have high bulk density and form no fine powder, and hence which are easy to handle and transport and are free from blocking and bridging troubles during storage.

A still further object of this invention is to provide a method of producing polymer particles with give homogeneous moldings with few fish eyes and which can be directly injection-molded without prior pelletization.

Other objects and features of this invention will become apparent from the descriptions given below.

This invention was accomplished to overcome all the difficulties associated with prior arts and to achieve the above-mentioned objects.

DETAILED DESCRIPTION OF THE INVENTION

This invention relates to a method of producing coagulated colloidal particles with close-packed structure which comprises the following steps:

(A) adding a coagulant to aqueous colloidal particles that can be coagulated by addition of a coagulant, at a temperature lower than the temperature at which said colloidal particles begin to agglomerate by fusion (melting or softening point), under such conditions that said coagulant will be present in discrete units in the dispersion before it is brought into solution by dissolution;

(B) allowing the molecules of coagulant to gradually diffuse from said coagulant units into the surrounding dispersion, thereby coagulating the colloidal particles on the surface of each coagulant unit, causing the coagulated particles to grow from inside to outside of each unit, and producing coagulated particles of desired size with regularly packed structure;

(C) separating the coagulated particles thus formed from the dispersion; and (D) drying, or heating in an aqueous phase, the coagulated particles separated above at a temperature lower than the softening point of said colloidal particles.

This invention also relates to a method of producing coagulated colloidal particles in the form of powder with densely and evenly packed internal structure and free from voids by further heating the dried particles obtained above at a temperature higher than the softening point.

The method of this invention can be applied to any aqueous colloidal particles that can be coagulated by addition of a coagulant and can be recovered as solid.

Solid herein means any substance that behaves, and can be handled, as solid, and includes rubber-like materials (elastic materials) and highly viscous plastic gel. Even coagulated particles which are liquid at room temperature, if solidified by cooling, can be treated under cooling by the method of this invention. Polymer latexes are taken as example of aqueous colloidal particles in the following explanation.

In the method of this invention, a coagulant is added to a polymer latex under conditions that minimize diffusion of said coagulant into said latex, thereby forming units of seed coagulant dispersed in the latex, the molecules of coagulant in each seed coagulant unit are then allowed to diffuse gradually into the surrounding latex to cause coagulation around the surface of each seed and to grow the coagulated particles from inside to outside, the coagulated particles thus grown are separated from the latex, and the particles collected are sintered, after being dried, at a temperature higher than the softening point of the polymer. The coagulated particles thus obtained are spherical particles, each being composed of primary particles of latex regularly arranged in a crystalline state.

The coagulant used in this invention is any compound capable of coagulating the latex or any substance which, in conjunction with another substance previously added to the latex, forms a new compound capable of coagulating the latex.

The above-mentioned compound capable of coagulating polymer latexes may be a gas, liquid or solid; the slurry obtained by coagulation of a latex may serve as a coagulant; capsule-like complexes may be prepared by using slurry, previously coagulated by addition of a coagulant, as the coagulant for a latex of same or different type; or similar capsule-like complexes may be prepared by adding powder or granules, previously mixed or impregnated with a coagulant, to a latex (a technique for previously preparing seed coagulant).

Examples of coagulants used in the form of solid or liquid include inorganic salts, such as sodium chloride, potassium chloride, lithium chloride, sodium bromide, potassium bromide, lithium bromide, potassium iodide, potassium sulfate, ammonium chloride, sodium nitrate, potassium nitrate, calcium chloride, ferrous sulfate, magnesium sulfate, zinc sulfate, copper sulfate, barium chloride, ferrous chloride, magnesium chloride, ferric chloride, ferric sulfate, aluminum sulfate, potassium alum and iron alum; inorganic acids, such as hydrochloric, sulfuric, phosphoric and nitric acids; inorganic bases, such as caustic soda, caustic potash, calcium hydroxide and magnesium hydroxide; organic acids, such as acetic and formic acids; and salts of organic acids, such as sodium acetate, calcium acetate, sodium formate and calcium formate. These are used either alone or in combination, in the form of solid or liquid (as solutions in water or water-soluble organic solvents). Solid coagulants may also be added in the form of a slurry in a water-soluble organic solvent.

The latexes to which the method of this invention is applicable are any latexes composed of particles that can be recovered in the form of solid. These include the polymer latexes as described below, and virtually all the polymer latexes which are prepared by emulsion or suspension polymerization and from which polymers can be recovered in a resinous form can be successfully treated by the method of this invention.

Latexes, and mixtures thereof, of polymers or copolymers (including graft copolymers) composed mainly of at least one member selected from the following monomers can be used in the method of this invention: aromatic vinyl monomers, such as styrene, monochlorostyrene, dichlorostyrene and α-methylstyrene; cyano vinyl monomers, such as acrylonitrile and methacrylonitrile; acrylates, such as methyl, ethyl and butyl acrylates; methacrylates, such as methyl, ethyl and butyl methacrylates; vinyl halides, such as vinyl chloride, vinyl bromide and vinyl fluoride; vinylidene halides, such as vinylidene chloride and vinylidene bromide; acrylic acid, methacrylic acid, itaconic acid, maleic acid, vinyl acetate, ethylene, propylene, butylene, butadiene, isoprene and chloroprene; and cross-linkable monomers, such as allyl methacrylate, diallyl phthalate, triallyl cyanurate, monoethylene glycol dimethacrylate, tetraethylene glycol dimethacrylate, divinylbenzene and glycidyl methacrylate.

Of these, the polymer latexes shown below are most preferred:

(1) A polymer latex obtained by polymerizing 20 to 80 parts of acrylonitrile; 20 to 80 parts of at least one member selected from the group consisting of vinyl chloride, vinylidene chloride, vinyl bromide and vinylidene bromide; and 0 to 10 parts of a dyable monomer.

(2) A latex of polybutadiene or butadiene copolymer composed of 0 to 50% ("%" hereinafter means weight percent unless otherwise specified) of styrene and 50 to 100% of butadiene.

(2') A polymer latex obtained by polymerizing, in the presence of 20 to 80 parts of a latex of (2) above, 20 to 80% of a monomer mixture composed of 0 to 50% of an acrylate, 0 to 100% of a methacrylate, 0 to 90% of a cyano vinyl monomer and 0 to 20% of other copolymerizable monomer.

(3) A polymer latex obtained by polymerizing, in the presence of a latex of elastomer composed of 0 to 50% of styrene, 50 to 100% of butadiene and 0 to 30% of an acrylate, 20 to 80% of a monomer mixture composed of 0 to 100% of methyl methacrylate, 0 to 60% of an acrylate or an methacrylate other than methyl methacrylate, 0 to 90% of an aromatic vinyl monomer and 0 to 90% of a cyano vinyl monomer.

(4) A mixture of (A) 0 to 50 parts of a latex of graft copolymer obtained by polymerizing, in the presence of 10 to 90% of polybutadiene or butadiene copolymer composed of 0 to 50% of styrene and 50 to 100% of butadiene, 10 to 90 % of at least one member selected from the group consisting of aromatic vinyl monomers, methacrylates, acrylates, and cyano vinyl monomers; and (B) 50 to 100 parts of a latex of copolymer composed of 0 to 70 mol % of α-methylstyrene and 30 to 100 mol % of at least one member selected from aromatic vinyl monomers, methacrylates, acrylates, acrylic acid and cyano vinyl monomers.

(5) A polymer latex obtained by polymerizing 15 to 95 parts of at least one member selected from methacrylate, cyano vinyl monomers, acrylates, aromatic vinyl monomers and other monomers copolymerizable therewith, in the presence of 5 to 85 parts of an elastomer composed of 40 to 100% of an acrylate, 0 to 60% of at least one member selected from aromatic vinyl monomers, cyano vinyl monomers, vinyl chloride, vinylidene chloride, vinyl acetate and conjugated diolefins, and 0 to 10% of a crosslinker.

(6) A polymer latex obtained by polymerizing 40 to 100 parts of vinylidene chloride and 0 to 60 parts of at least one member selected from aromatic vinyl monomers, cyano vinyl monomers, acrylates, methacrylates, acrylic acid, methacrylic acid, itaconic acid, maleic acid and cross-linkable monomers.

(7) A polymer latex obtained by polymerizing 40 to 10 parts of vinyl chloride, 0 to 20 parts of a cyano vinyl monomer and 0 to 60 parts of at least one member selected from vinylidene chloride, vinyl bromide, vinylidene bromide, acrylates, methacrylates, acrylic acid, methacrylic acid, itaconic acid, maleic acid and crosslinkable monomers.

The first step of the method of this invention is to disperse the coagulant in the latex in discrete units while minimizing its solution into the aqueous phase. Since the rate of coagulation generally is extremely high, it takes place while the coagulant is being dispersed, forming coagulated particles around each coagulant unit to cover its surface. In some cases, coagulated particles in which coagulation has proceeded only partially split into fragments, each fragment being dispersed in the latex and providing seed coagulants. Even when a liquid or gaseous coagulant is used, the resultant seed coagulants dispersed are solid particles containing original coagulant molecules as core surrounded by the crust of coagulated particles.

In the second step of the method of this invention, the coagulant molecules in each unit diffuse out through the crust, and cause coagulation the moment they come into contact with the latex to deposit polymer particles on the surface, thereby gradually laminating the coagulated particle layers.

Thus the point in practicing the method of this invention is in the first step. One may understand that:

(1) If the rate of coagulation is low, coagulation is less likely to occur on the surface of each unit; instead, the coagulant molecules tend to extensively diffuse into the latex phase to cause random coagulation.

(2) If the layer of the coagulated particle formed on the surface is insufficient in rigidity for its behaving as solid, the confined coagulant molecules tend to diffuse into the latex phase, causing random coagulation.

Cases (1) and (2) both lead to so-called bulk coagulation of latex, representing the very picture of conventional latex coagulation processes.

Therefore, what is most important for achieving the purpose of this invention is to set conditions that will minimize the behaviours shown in (1) and (2). When a coagulant is used in the form of an aqueous solution, its concentration is preferred to be as high as possible.

When a dilute solution has to be used, special techniques should be adopted in order to ensure discrete coagulant units; for example, increasing the solution viscosity by addition of a thickening agent, or lowering the reaction temperature, thereby retarding the diffusion of coagulant molecules into the latex phase and suppressing the resulting random coagulation. The most simple and sure-fire way for this is to use a coagulant in the form of solid powder. With liquid or gaseous coagulants, in particular, those which show higher coagulation speed are likely to give consistent results. As a rule, acids and polyvalent metal salts can be used advantageously, but too high a coagulation rate often gives adverse results. Hence, the concentration of coagulant must be properly controlled (with air, nitrogen or carbon dioxide in the case of gaseous coagulants) in some cases. Diffusion of coagulants into the latex phase, as well as the correlation between reaction rate and diffusion rate, can also be controlled by temperature adjustment (cooling) or viscosity adjustment (addition of thickening agent).

The same is true of the concentration of latex. The lower the concentration, the lower will be the probability of latex particles coming close to the surface of each coagulant unit. This means that the coagulant molecules are more likely to diffuse into the latex phase, resulting in higher probability of case (1). The solid content of coagulated particle layer (the crust of each coagulant unit) will also be lower, resulting in lower rigidity of the crust. This means higher probability of case (2). Hence, higher latex concentration is sure to give intended polymer particles.

Several embodiments of this invention will be detailed below.

(1) Use of a solid coagulant:

(a) A latex placed in a beaker is kept stirred, a powdery coagulant (e.g., a salt) is added, stirring is intensified for a moment to ensure uniform dispersion of the coagulant, and then mild stirring is restored at once. After maintaining that condition for one minute to one hour, stirring is stopped and the coagulated particles are collected by filtration through a sieve. The latex in the beaker may be cooled with ice water prior to coagulation, as required. If stirring is too weak, the coagulant tends to sediment on the bottom, giving hemispherical coagulated particles.

(b) A powdery coagulant is dispersed in a water-soluble organic solvent in which that coagulant is insoluble or sparingly soluble (e.g., alcohols and ketones), and this dispersion is added to a latex.

(2) Use of a liquid coagulant:

(a) A liquid coagulant is added dropwise to a latex.

(b) A liquid coagulant is sprayed into a latex (addition in the form of fine droplets).

(c) When a liquid coagulant is added all at a time, vigorous stirring is continued only while the coagulant is being added to disperse the coagulant in the form of droplets, followed by mild stirring.

In order to lower the diffusion rate, it is preferable that the latex and coagulant be cooled previously. There is no need for cooling after dispersion. Addition of a thickening agent is also effective in suppressing diffusion to obtain dispersed droplets.

(3) Use of a gaseous coagulant:

A previously cooled gaseous coagulant is introduced into a previously cooled latex near under the agitating blades with vigorous stirring.

(4) Use of a slurry or solid-impregnated coagulant:

Normally, the same procedure as in the case with solid coagulant may be adopted. A slurry coagulant may be prepared, for example, by adding a dilute aqueous solution of coagulant to a latex with vigorous stirring (random coagulation). A solid-impregnated coagulant is, for example, a product prepared by immersing solid powder in an aqueous solution of coagulant to impregnate the powder with the coagulant, and collecting the solid by filtration.

Stirring after seed coagulants have been formed should be sufficiently mild so that coalescense due to collision among coagulated particles will just be obstructed. Since the coagulated particles continue to grow, coalescense is likely to occur and proper control of stirring is necessary. Too vigorous stirring, on the other hand, brings about not only coalescense but also breakdown of the coagulated particles, which results in extensive diffusion of coagulant and leads to ordinary random coagulation. Utmost care must be taken particularly when the latex concentration is low and a coagulant of low coagulating power is used. It is preferable that the system be maintained in the laminar flow state during coagulation.

As described above, how to set the operating conditions during coagulation is the essential point in practicing the method of this invention. It is therefore necessary to experimentally grasp the correlation among coagulant dispersion rate, rate of coagulation and coagulant diffusion rate, although it is impossible to determine the absolute values of these data. To this end, it is imperative to know the effects of operating conditions (such as temperature, viscosity and rate of stirring) upon formation of coagulated particles and other latex behaviors.

The coagulated particles of this invention must be recovered in a state that the primary particles contained remain unagglomerated. Hence, coagulation must be performed while maintaining the temperature of the entire system (the temperature in the whole latex tank) below the softening point of the primary particles; external cooling is required for latex particles whose softening point is lower than normal temperature.

Since the rate of coagulation which occurs as the first step immediately after the dispersion of coagulant in the latex phase is extremely high, each of the coagulated particles thus produced contains, in its core, a small quantity of random, loose-packed portion. This portion tends to be large with coagulants of higher coagulating power, and at lower concentrations when a liquid coagulant is used. When a solid coagulant is employed, on the other hand, each coagulated particle contains voids—empty space left after original solid coagulant molecules have diffused out. In any event, this loose-packed portion or voids are negligibly small in size compared with the entire particle; hence the coagulated particles can be regarded as homogeneous as a whole.

The method of this invention is basically different from conventional coagulation processes, although there seems to be no substantial difference in actual operation. The fundamental difference is that the coagulated particles in conventional processes are aggregates in which primary latex particles are randomly packed. Conventional processes may be roughly classified into three types, each of which is described below with emphasis placed on actual operations.

(1) The first method is to simply mix a latex and a coagulant together.

Since coagulation is normally an instantaneous reaction, soltuion and diffusion of the coagulant in latex immediately leads to coagulation. In this method, an aqueous solution of an acid or salt is generally used as coagulant and it is directly mixed with a latex. Thus three phenomena—mixing of coagulant and latex, solution and diffusion of coagulant in latex, and coagulation of latex—proceed simultaneously. Since the rate of coagulation is very high, the following steps take place sucessively: (a) formation of coagulum the moment the coagulant comes into contact with the latex; (b) fragmentation of said coagulum by external force (for example by stirring); and (c) mixing of the coagulant molecules released by fragmentation with the latex, ultimately resulting in bulk coagulation of the whole latex system. The coagulated particles can thus be obtained as a nearly homogenous slurry, unlike the particles of this invention.

The random coagulum obtained by this method contains much water, is thixotropic in nature, and do not behave as a liquid even at a concentration as low as 20%. This requires dilution with water before coagulation. When the solid concentration is very low, however, a weak force is sufficient for mixing; a coagulated slurry can be obtained merely by a stream of water.

It is also possible to make the rate of coagulation lower than the rates of solution and diffusion, if a dilute aqueous solution of a coagulant of low coagulating power is used. In this case, bulk coagulation of the whole latex system takes place after the coagulant becomes uniformly dispersed; hence, an agar-like coagulated latex is formed when stirring is omitted, while a slurry of minute particles results when coagulation is performed under stirring.

(2) The second method is to add a latex to an aqueous coagulant solution in the form of discrete droplets, or in the form of a continuous flow (linear or zonal) through a nozzle or the like.

This method is intended to produce coagulated particles just in the shape of the discrete droplets, or to break down the linear or zonal coagulum formed in the latex into particles. In the latter case, the size of coagulated particles is determined by the severity of breakdown, and hence is controlled by the intensity of stream and temperature. Since the latex readily diffuses into the aqueous phase and the coagulated particles are easy to disintegrate, it is imperative to fuse the surface layer of each coagulated particle by, for example, raising the temperature above the softening point of the primary particles. This means that coagulation and particle fusion are caused to proceed rapidly and simultaneously. The result is coagulated particles of randomly and loosely packed structure.

Thus, the particles obtained by methods (1) and (2) give amorphous powder of a broad particle size distribution.

(3) The third method is to spray the latex into a coagulatory atmosphere.

This technique is characterized in making the best use of surface tension to eliminate the disadvantages of method (2), but involves the following two problems:

(a) The coagulated particles do not tend to contract, leaving excess water inside. The remaining water retards rearrangement of regular structure and leaves voids after drying.

(b) Particles falling in the gaseous phase tend to be broken down while being collected. This tendency is more marked under conditions that will minimize the formation of voids in each particle (for example, at lower temperatures). In addition, this method requires large equipment, and it is hardly possible to produce particles of large size.

With the coagulated particles obtained by the conventional coagulation processes described above, close-packed internal structure cannot be achieved by drying or heating in an aqueous phase, nor it is to be expected to obtain homogeneous internal structure by sintering. This is probably because primary latex particles are randomly and loosely packed in each coagulated particle. Voids herein means empty space larger than the primary particles, and do not include the minute space left among primary particles of closest packing. As may be seen from the foregoing, coagulated particles separate out from aqueous phase in any of the methods (1), (2) and (3), while the particles separate out from latex in the process of this invention. This suggests the basic difference between the process of this invention and conventional methods.

In the process of this invention, a state is first established in which high-concentration coagulant is present in discrete units without being dissolved in the latex, and then the coagulant molecules are allowed to gradually diffuse into the latex phase. Thus the diffusion of coagulant molecules is the rate-determining step of coagulation in this system. By so controlling the operating conditions, primary particles can be regularly arranged in each of the coagulated particles. In addition, since primary particles, when deposited on the surface of each coagulated particle, tend to orient themselves in closest packing, the packing density in coagulated particles is greater than that in the original latex. The packing density in coagulated particles is dependent upon their coalescing force and the time allowed for orientation. When primary particles come into contact with one another, they cannot orient themselves in close packing if their coalescing force is high. This relation is dictated by the difference between the softening point of latex particles and the temperature of the coagulation system. The only attractive force exerted among primary particles is van der Waals force, which is very weak; hence, a suitable external force should be applied to ensure high packing density. One example is to create a vortex by properly controlling the flow conditions of the system, but this imposes a certain limitation upon the size of coagulated particles. On the other hand, the lower the rate of coagulation and the rate of coagulant diffusion, the longer will be the time allowed for orientation of primary particles, resulting in higher packing density. Although van der Waals force, which is the only binding force among primary particles where no coalescense occurs, is very weak, the primary particles, when packed in a network structure, are firmly bonded together. Furthermore, as the number of latex particles kept in contact with one another increases (that is, the greater the rate of packing), the particles will be packed more regularly, resulting in higher self-bonding force. As a result, the coagulated particles can be handled as solid in industrial processes without any trouble. The necessary self-bonding force for this purpose may vary with actual handling conditions and depends on the packing rate of primary particles. The packing rate should generally be 10 vol % or higher, preferably 20 vol % or higher (the higher, the better). It may be necessary, according to actual handling conditions, to take special means, such as previously concentrating the latex being coagulated, and lowering the rate of coagulation or diffusion. The coagulated particles with increased packing rate thus obtained are free from deformation and disintegration troubles that might otherwise occur during mechanical operations, such as separation from latex and washing. A stepped, stratified cleavage plane is exposed when a coagulated particle obtained above is split, suggesting a crystalline internal structure.

In conventional processes, coagulated particles, in order to be handled as solid, must be subjected to after-treatment to effect coalescense of primary particles included, for example, heat treatment, or addition of an organic solvent or binder in the case of heat-resistnt resins with high softening points. No such treatment is needed at all with the coagulated particles of this invention.

The size of coagulated particle and its distribution are dictated by the size of individual coagulant units dispersed in the latex, its distribution, as well as coagulation time and its scatter. In this respect, the method of this invention is ideal for producing coagulated particles of uniform size free from fine powder. If particles of smaller size are to be produced, this may be effected by dispersing a coagulant of low coagulating power in smaller units and separating the product from the aqueous phase in a short time. Just the opposite will do when coagulated particles of larger size are to be produced. Particle size can thus be controlled as desired, but generally the method of this invention is best suited for the production of coagulated particles 200 $\mu$m to 1 cm in diameter. It is rather easy to obtain coagulated particles of uniform size. To ensure further enhanced particle size uniformity, it is advisable that the size of coagulant units and coagulation time be as even as possible. In continuous operations, in particular, a proper measure should be taken to ensure even residence time of cogulated particles in the system.

Particle size may also be affected by coalescense. The coagulated particles formed by the method of this invention are composed of primary particles regularly packed, and hence no coalescense takes place after complete coagulation so long as the temperature is maintained below the softening point of latex particles. However, coalescence is likely to occur while each longitudinal particle is growing, especially in the early stage of coagulation. To prevent such coalescense, it is necessary to lower the density of growing particles in the latex or to give kinetic energy to the particles, for example, by agitation. Excessively vigorous agitation should be avoided because it can break down the coagulated particles or otherwise affect the stability of the system, leading to bulk coagulation of the entire latex. A mild, laminar flow state is preferable for the growth of particles.

The size of coagulated particles can thus be freely selected (from powder to lumps), but what is to be noticed here is that the final size of dried or sintered particles is also affected by the degree of particle contraction, which in turn is dictated by the amount of water contained inside each coagulated particle.

It may be understood from the foreoing that suitable ranges for coagulating conditions (e.g., type and nature of coagulant, stirring conditions, temperature and residence time) may be set if the properties of latex being treated are known. However, it is needless to say that optimum conditions should be determined experimentally. What is important is to grasp the fundamental mechanism for the formation of coagulated particles as detailed above and to know how the coagulated particles behave in response to the changes in operating conditions. Extra caution should be exercized not to fall into the coagulation mode of conventional processes—the coagulant, which must be present in discrete units, partially coming into solution and diffusing in the latex phase to affect its stability, eventually resulting in bulk coagulation. Normally, satisfactory results can be achieved by selecting proper operating conditions as explained above. In special cases where cost and quality requirements are particularly stringent, however, it may be necessary to give consideration further to stabilization of the latex system and to modification of the equipment. These include addition of a latex stabilizer (e.g., dispersant and emulsifier) before or during coagulation process; and a new coagulation system, in which a coagulant is added dropwise into an atmosphere containing atomized latex and the seed coagulant thus formed is then dispersed in the latex being treated.

The coagulated particles thus produced contain primary latex particles regularly packed; hence, closer packing can be easily achieved by mere removal of water contained.

When the coagulated particles are dried at a low temperature at which coalescense of primary particles does not occur, the space left after water has been removed is closely packed with surrounding primary particles by capillary action, forming a nearly perfect hexagonal closepacking structure. This may be demonstrated by the following facts: splitting a particle invariably reveals cleavage planes (and not free cutting surfaces), indicating a crystalline structure; fragments formed by splitting are all crystals of the same structure (probably monoclinic or hexagonal system); and the packing rate of primary particles is no lower than 73%. Thus the voids among closely packed primary particles remain continuous, making drying and removal of other volatile matters very easy.

When coagulated particles are treated with water, an acid or an alkali solution to remove the coagulant, emulsifier and other impurities remaining on the surface or inside, it is possible to exclude the water left contained inside the coagulated particles, thus accelerating further packing and contraction, if the treatment is conducted at an elevated temperature that does not induce coalescense.

Such a heat treatment, which significantly decreases the amount of water contained in coagulated particles, is also effective in saving the energy required in the subsequent drying step. In addition, it effectively remove the impurities which might otherwise be left inside each coagulated particle. If, in this case, the heat treatment is conducted at a temperature above the softening point of the latex particles, coalescense progresses from the surface layer, leaving a considerable amount of water inside. The result is insufficient contraction and voids left after drying. The higher the temperature, the larger will be the voids left.

When the coagulated particles, obtained according to the method of this invention described above, are dried at a temperature lower than the softening point, a capillary force will be created as the water is removed from the primary particles, thus strongly attracting the surrounding particles. As a result, each coagulated particle contracts and the packing rate increases accordingly. If, in this case, a loosely packed structure is to be produced, this may be effected by drying at higher temperatures (to ensure higher coalescense speed compared with water vaporization speed). In air drying, the material is maintained at the wet-bulb temperature during constant-rate drying period; hence, the atmospheric temperature has to be held at a level considerably higher than the softening point of the latex particles. With a material of low thermal conductivity, such as polymers, the rise in temperature is limited only to the surface layer of each particle, and hence a crust is formed with an increase in temperature. This trouble can be avoided by drying with superheated steam. The softening point of a material herein means the temperature at which fusion of that material is observed, and may generally be considered to be equal to its melting point. However, it is difficult to clearly define the softening point of polymeric substances, which have no definite melting point. Even with polymers of the same composition, the softening point is not determined by the polymerization degree and its distribution alone, but is highly affected also by the degree of crystallinity and additives that have plasticizing effect. In actual practice, however, it may reasonably be taken to lie in the following range, $$\frac{T_g + 273}{0.8} - 273 \sim \frac{T_g + 273}{0.6} - 273$$

wherein $T_g$ is the glass transition temperature (°C.) of the polymer under consideration. Since the approximate value of softening point can thus be estimated, it is rather easy to find the optimum operating temperature after a few test experiments.

The validity of the above formula was proved by scanning electron-microscopic observations of the internal structure of coagulated particles (presence or absence of coalesced primary particles) produced at different temperatures from latexes of polymers having different softening points. It was also found that, the particles contracted and made denser by drying or heat treatment show, on their cleavage surface, regularly stepped and stratified crystal planes and striped patterns indicative of crystal growth, which are more marked and conspicuous than in untreated particles. This, combined with the development of cleavage planes, suggests that contraction has progressed along the crystal planes.

Coagulated particles dried as described above, if subjected to sintering at a temperature higher than the softening point of the primary particles, give filled particles with no void inside. Contraction of the particles also occurs because the primary particles included get homogeneously molten. As a result, each particle shows a lustrous appearance, becoming transparent if made of a resinous material. This sintering operation can be conducted successively after drying, but proper temperature control is necessary because voids might be left inside if a continuous suface layer is formed prior to complete drying. When oxidation of the material is feared, sintering may be carried out in an oxygen-free atmosphere, for example, in an inert gas (e.g., nitrogen gas) or superheated steam, or in vacuum. Higher temperatures may be adopted to complete sintering in shorter time, so long as Polymer deterioration does not occur by decomposition or oxidation. It is also possible to control the degree of coalescense and melting of the primary particles as desired by proper combination of sintering temperature and time.

In order for the sintering operation to be effective in achieving denser internal structure, it is essential that the primary particles have been regularly arranged in closest packing. The particles which have been subjected to sintering (even those particles having homogeneous, molten internal structure) show cleavage planes when split. The stepped, stratified crystalline structure and the striped patterns indicative of crystal growth are more conspicuous than in the case with untreated particles.

With coagulated particles in which primary particles are randomly arranged, like those produced by conventional processes, sintering results only in coalescense and does not lead to rearrangement of the primary particles, thus leaving voids. This is always the case irrespective of the sintering temperature. To effect deaeration, these particles have to be treated in an extruder to form pellets. This operation requires far higher temperature and pressure (far larger quantity of energy) than sintering.

Each of the coagulated particles obtained by the method of this invention, whether it be subjected to sintering or not, contains minute voids derived from the small quantity of random, loose-packed portion formed in the initial stage of coagulation. Similar minute voids are also observed when a solid coagulant is used. But these minute voids are negligibly small in size compared with the entire particle, and the coagulated particles of this invention may reasonably be considered as homogeneous as a whole.

The coagulated particles thus obtained have the following properties:

(1) High-purity particles, with water- and oil-soluble impurities (e.g., inorganic salts, residual monomers and organic solvents) having been readily removed.

The voids among packed primary particles remain open and continuous before sintering operation. This facilitates removal of water- and oil-soluble impurities by immersion in, or washing with, water, an acid or alkali solution, or an organic solvent (e.g., alcohols and ketones). High-boiling impurities can also be removed efficiently by drying or stripping operation (e.g., aeration) in the state of aqueous dispersion.

In the coagulated particles produced by conventional methods, on the other hand, the primary particles included are forced to coalesce by heat treatment or addition of an organic solvent to ensure self-binding force sufficiently high for subsequent handling. As a result, the surface layer of each coagulated particle changes to a continuous polymeric layer, substantially retarding the diffusion of inside molecules and making removal of impurities on an industrial scale extremely difficult. This provides one major disadvantage of emulsion polymerization.

(2) Easy dispersion and solution in solvents

When desired, dry particles can be finely dispersed or dissolved very rapidly in an aqueous medium or an organic solvent.

When dissolving a polymer in an organic solvent, it is common practice to first disperse the polymer particles in the solvent held at a lower temperature (to lower its dissolving power) and then bring the dispersed particles into solution by heating. In the coagulated particles of this invention, the solvent penetrates through the primary particles (closely packed but not coalesced), thus readily dispersing each primary particle in it. The coagulated particles of conventional processes, on the contrary, are very slow to dissolve or disperse, because the unit of dispersion is each coagulated particle. Hence, the polymer is commonly supplied in the form of fine powder at the sacrifice of other powder characteristics, posing many problems in the manufacturing process.

(3) Excellent properties and characteristics as particles

The coagulated particles of this invention, both sintered and unsintered, have high rigidity because of the primary particles closely packed and hence withstand normal transportation, storage and other mechanical operations with no danger of the particles being disintegrated. The bulk density is higher compared with conventional products, significantly improving flow properties. There is no danger of dust formation. Thus, packaging and transportation costs can be cut, blocking and bridging troubles in storage tanks are eliminated, and bulk transportation on tank trucks and storage in silos are feasible. In addition, many improvements are also expected in polymer processing, such as higher workability of molding operations, improved working conditions due to minimized dust generation, and automation of various processing operations. Furthermore, adverse effects of impurities upon product quality can be eliminated.

The coagulated particles obtained after drying, each composed of primary particles left uncoalesced, give moldings of consistent quality free from fish eyes and other similar defects. The sintered particles are dense particles comparable with the pellets and moldings obtained after treatment in a molding machine, and hence can be directly subjected to injection molding without the need for pelletizing process. This completely eliminates one major disadvantage associated with conventional emulsion polymers.

The process of this invention not only gives the dried particles comprising primary paritcles of closest packing and the sintered particles comprising densely filled primary particles, but also enables one to freely design, as required, their internal structure as shown below.

(a) Heat treatment (wet) or drying step:

Adjustment of primary particle packing rate and packing mode by controlling the balance between the speed of water exclusion and the coalescense speed of primary particles.

(b) Sintering step:

Adjustment of packing density by controlling the coalescense degree of primary particles.

The following Examples further illustrate this invention but are not intended to limit its scope.

EXAMPLE 1

A polymer latex (300 ml; solid content: 30%, 30° C.), which is a mixture of (A) 35% of a latex of graft copolymer composed of 60% butadiene, 10% methyl methacrylate, 10% acrylonitrile and 20% styrene and prepared by grafting a mixture of styrene, acrylonitrile and methyl methacrylate onto a polybutadiene, with (B) 65% of a latex of copolymer composed of 20% α-methylstyrene, 25% acrylonitrile and 55% styrene, was placed in a 500 ml beaker and stirred at room temperature at a speed of 400 rpm using a triple-blade propeller mixer (d/D: 0.5). Granules of sodium chloride (0.2 to 0.5 mm in size) were added as coagulant and rapidly dispersed for about ten seconds. The revolution speed of the mixer was then lowered to 100 rpm and mild stirring was continued for 20 minutes.

The resulting mixture was passed through a 60-mesh sieve, and the coagulated particles collected were washed with water, dewatered on a suction filter, dried in a box dryer at 70° C. for about four hours, and sintered at 140° C. for 30 minutes in a nitrogen atmosphere.

The particles obtained after drying were white, spherical powder with a bulk density of 0.49 g/cm$^3$ and a particle size of 6 to 16 mesh (96% pass), and could be readily redispersed in a dilute soap solution by shaking for about 40 minutes. Sintering gave lucid spherical particles of close-packed structure having pearl-like luster and a bulk density of 0.66 g/cm$^3$. The latex passing through the sieve contained no coagulated particles at all.

COMPARATIVE EXAMPLE 1

An experiment was conducted in the same manner as Example 1, except that stirring was continued at a revolution speed of 400 rpm even after addition of the coagulant. Coagulation started over the entire latex phase in about 15 minutes, finally leading to bulk coagulation 18 minutes later. No coagulated particles could be recovered.

EXAMPLE 2

A latex of graft copolymer (300 ml; solid content: 30%), composed of 35% styrene, 30% methyl methacrylate and 35% butadiene and prepared by grating a mixture of styrene and methyl methacrylate onto a styrene-butadiene copolymer, was placed in a 500 ml beaker, and stirred at 5° C. at a low speed of 100 rpm using a triple-blade propeller mixer (d/D: 0.5) while externally cooling with ice water. Concentrated hydrochloric acid (about 35%) previously cooled to 5° C. was added dropwise as coagulant by means of a pipette.

After stirring was continued for about 10 minutes, the resulting mixture was passed through a 60-mesh sieve, and the coagulated particles collected were washed with water, dewatered on a suction filter, dried in a box dryer at 40° C. for about five hours, and sintered at 120° C. for 40 minutes in a nitrogen atmosphere.

The particles obtained after drying were white, spherical powder with a bulk density of 0.44 g/cm$^3$ containing virtually no void inside. Approximately one gram of this powder was put in 20 ml of dichloromethane placed in a 100 ml beaker, and the mixture was stirred on a shaking machine. A clear solution was obtained in two minutes. Sintering gave spherical particles of close-packed structure containing virtually no void inside and having pearl-like luster and a bulk density of 0.55 g/cm$^3$.

COMPARATIVE EXAMPLE 2

An experiment was conducted in the same manner as Example 2, except that 1% hydrochloric acid was used as coagulant. Bulk coagulation took place over the entire system in several minutes, and no coagulated particles could be recovered.

EXAMPLE 3

A latex of a copolymer (300 ml; solid content: 25%, 15° C.) composed of 50% acrylonitrile and 50% vinyl chloride was placed in a 500 ml beaker, and vigorously stirred at room temperature at a speed of 400 rpm using a triple-blade propeller mixer (d/D: 0.5). Powder of calcium chloride was added as coagulant and rapidly dispersed for about ten seconds. The revolution speed of the mixer was then lowered to 100 rpm and mild stirring was continued for ten minutes.

The resulting mixture was passed through a 60-mesh sieve, and the coagulated particles collected were washed with water, dewatered on a suction filter, dried in a box dryer at 45° C. for about four hours, and sintered at 100° C. for 30 minutes in a nitrogen atmosphere.

The particles obtained after drying were white, spherical powder. Approximately five grams of this powder was put in 20 ml of acetone previously cooled to $-15°$ C., and the mixture was shaken by hand. A homogeneous dispersion was obtained in five minutes. Sintering of the dried particles gave transparent powder of close-packed structure with a bulk density of 0.68 g/cm$^3$.

COMPARATIVE EXAMPLE 3

An experiment was conducted in the same manner as Example 3, except that the solid content of the copolymer latex was altered to 3% and particle separation was performed two minutes later. The coagulated particles formed were fragile and disintegrated while being filtered through the sieve. Bulk coagulation of the latex started about five minutes later, forming a body of viscous, agar-like coagulum.

EXAMPLE 4

A latex of a copolymer (300 ml; solid content: 35%) composed of 70% α-methylstyrene and 30% acrylonitrile was placed in a 500 ml beaker, and stirred vigorously at 15° C. at a speed of 400 rpm using a triple-blade propeller mixer (d/D: approx. 0.5). A slurry of powdery aluminum sulfate in acetone was added by means of a pipette and rapidly dispersed for about ten seconds. The revolution speed of the mixer was then lowered to 100 rpm and mild stirring was continued for ten minutes.

The resulting mixture was passed through a 60-mesh sieve, and the coagulated particles collected were washed with water, dewatered on a suction filter, dried in a box dryer at 100° C. for three hours, and sintered at 150° C. for 30 minutes in a nitrogen atmosphere.

The particles obtained after drying were white, spherical powder of close-packed structure having a particle size of 6 to 16 mesh (97% pass). Sintering gave transparent powder of close-packed structure having a bulk density of 0.70 g/cm$^3$ and a particle size of 6 to 16 mesh (98% pass).

COMPARATIVE EXAMPLE 4

An experiment was conducted in the same manner as Example 4, except that the initial revolution speed of the mixer was set at 100 rpm. Most of the coagulated particles collected were like diplococci in shape (two spheres put together by coalescense); hence, the bulk density was lower and flow properties poorer. In addition, bits of coagulum were left attached on the mixer blades.

EXAMPLE 5

A polymer latex (300 ml; solid content: 30%), which is a mixture of (A) 30% of a latex of graft copolymer composed of 65% butadiene, 10% acrylonitrile and 25% styrene and prepared by grafting a mixture of styrene and acrylonitrile onto a polybutadiene, with (B) 70% of a latex of copolymer composed of 70% α-methylstyrene, 10% methyl methacrylate and 20% acrylonitrile, was placed in a 500 ml beaker, cooled to 2° C. with ice water, and stirred at a speed of 400 rpm using a triple-blade propeller mixer (d/D: approx. 0.5). A 30% aqueous solution of calcium chloride was added as coagulant and rapidly dispersed for about ten seconds.

The revolution speed of the mixer was then lowered to 100 rpm and mild stirring was continued for 10 minutes.

The resulting mixture was passed through a 60-mesh sieve, and the coagulated particles collected were treated with 300 ml water, placed in a 500 ml beaker and held at 80° C., for 60 minutes under mild stirring. The particles thus treated were collected, washed with water, dewatered on a suction filter, and dried in a box dryer at 90° C. for about three hours. The filtrate separate in the above operation was very foul, emitting disagreeable odor. The hot water treatment reduced the water content of coagulated particles (values after drying) from 64% down to 47%. The amounts of chloride ions and sulfate ions (measured by ion chromatography) were also reduced significantly from 1.3% to 0.3%, and from 0.7% to 0.1%, respectively (%: based on the weight of dried particle). The particles obtained after drying were white, spherical powder with a bulk density of 0.48 g/cm$^3$. Sintering of the dried particles at 140° C. for 30 minutes in a nitrogen atmosphere gave lucid spherical particles of close-packed structure containing virtually no void inside and having pearl-like luster and a bulk density of 0.65 g/cm$^3$.

EXAMPLE 6

A latex of a graft copolymer (300 ml; solid content: 25%) composed of 40% styrene, 15% methyl methacrylate and 45% butadiene and prepared by grafting a mixture of styrene and methyl methacrylate onto a polybutdiene was placed in a 500 ml beaker, and stirred vigorously at 15° C. at a speed of 400 rpm using a triple-blade propeller mixer (d/D: approx. 0.5). Powder of magnesium sulfate was added as coagulant and rapidly dispersed for about ten seconds. The revolution speed of the mixer was then lowered to 100 rpm and mild stirring was continued for ten minutes.

The resulting mixture was passed through a 60-mesh sieve, and the coagulated particles collected were washed with water, dewatered on a suction filter, and dried in a box dryer at 35° C. for six hours, giving white spherical powder. Further sintering at 120° C. for 40 minutes in a nitrogen atmosphere gave powder of close-packed structure containing virtually no void inside and having a bulk density of 0.47 g/cm$^3$.

EXAMPLE 7

A polymer latex (300 ml; solid content: 30%), which is a mixture of (A) 33 parts of a latex of graft copolymer composed of 75% butadiene, 20% methyl methacrylate and 5% styrene and prepared by grafting a mixture of styrene and methyl methacrylate onto a polybutadiene, with (B) 67 parts of a latex of copolymer composed of 45% α-methylstyrene, 5% methyl methacrylate, 35% styrene and 15% acrylonitrile, was placed in a 500 ml beaker. Separately, 2 ml of the same latex as above was placed in a 50 ml beaker, 4 ml of 15% aqueous solution of calcium chloride was added, and the bulk coagulum formed was ground down with a spatula. The slurry of coagulated particles thus obtained was added to the latex placed in the 500 ml beaker at room temperature under stirring at a speed of 400 rpm using a triple-blade propeller mixer (d/D: approx. 0.5), and rapidly dispersed for ten seconds. The revolution speed of the mixer was then lowered to 100 rpm and mild stirring was continued for 10 minutes.

The resulting mixture was passed through a 60-mesh sieve, and the coagulated particles collected were collected, washed with water, dewatered on a suction filter, and dried in a box dryer at 100° C. for about one hour. The drying significantly reduced the amount of α-methylstyrene in the coagulated particles from 1.8% down to 0.13% (measured by gas chromatography). The dried particles were white spherical powder.

Sintering of the dried particles at 140° C. for 30 minutes in a nitrogen atmosphere gave lucid particles of close-packed structure containing virtually no void inside and having pearl-like luster and a bulk density of 0.64 g/cm$^3$.

EXAMPLE 8

A latex of a copolymer composed of 30% styrene and 70% butadiene (100 ml; solid ocntent: 25%) was placed in a 200 ml beaker and cooled to 0° C. Several drops of concentrated hydrochloric acid previously cooled to 0° C. was added dropwise as coagulant by means of a pipette, and the beaker was shaken by hand for ten minutes.

The resulting mixture was passed through a 60-mesh sieve, and the coagulated particles collected were washed with water, dewatered on a suction filter and vacuum-dried at room temperature, giving lucid elastomer particles.

EXAMPLE 9

A latex of a graft copolymer (300 ml; solid content: 8%), composed of 4% acrylonitrile, 40% methyl methacrylate, 40% styrene, 3% butyl acrylate and 13% butadiene and prepared by grafting a mixture of acrylonitrile, methyl methacrylate, butyl acrylate and styrene onto a styrene/butadeine copolymer, was placed in a 500 ml beaker and stirred vigorously at room temperature at a speed of 500 rpm using a triple-blade propeller mixer (d/D: approx.0.5). Upon addition of 30 ml of 0.5% hydrochloric acid, the entire system at once turned into a viscous slurry of coagulum.

The mixture was then heated at 75° C. on a heater with stirring, poured into a large quantity of water, and suction-filtered after cooling, giving powder of irregular shape.

The dewatered resin thus obtained was immersed in a large volume of 30% aqueous solution of calcium chloride for one hour, and the treated resin was collected on a suction filter. This wet resin impregnated with caclcium chloride was used as seed coagulant.

A latex of polyvinyl chloride prepared by emulsion polymerization (300 ml; solid content: 35%) was placed in a 500 ml beaker, and stirred at room temperature at a revolution speed of 400 rpm using the same mixer as above. The seed coagulant prepared above was added in small portions, the revolution speed of the mixer was lowered to 100 rpm, and mild stirring was continued for 20 minutes. The resulting mixture was passed through a 60-mesh sieve, affording slippery, oval particles. The coagulated particles thus collected were dried in a box dryer at 50° C., and then sintered at 120° C. for 30 minutes in a nitrogen atmosphere. The particles thus obtained were of composite structure, consisting of the seed coagulant polymer as core and polyvinyl chloride as crust. These were lucid particles of close-packed internal structure with virtually no void inside and having pearl-like luster and a bulk density of 0.59 g/cm$^3$.

EXAMPLE 10

A latex of a copolymer (300 ml; solid contnet: 35%) composed of 70% α-methylstyrene and 30% acrylonitrile was placed in a 500 ml beaker and cooled below 5°

C. A triple-blade propeller mixer (d/D: approx. 0.5) was set in said latex, and a glass tube with its one end reduced was disposed just below the propeller blades for introducing a coagulatory gas.

The latex was stirred at a revolution speed of 600 rpm, and HCl gas from a cylinder, cooled below −5° C. while being passed through a gas reservoir held at −20° C., was introduced into the latex through the glass tube. Upon stopping the supply of HCl gas, the revolution speed of the mixer was lowered down to 100 rpm, and mild stirring was continued for ten mintues.

The resulting mixture was passed through a 60-mesh sieve, and the coagulated particles collected were washed with water and dried in a box dryer at 105° C. for two hours, giving somewhat lucid, white spherical powder of close-packed structure having a bulk density of 0.52 g/cm$^3$. Further sintering at 140° C. for 30 minutes in a nitrogen atmosphere gave transparent particles of close-packed structure having a bulk density of 0.69 g/cm$^3$.

What is claimed is:

1. Method of producing densely packed coagulated colloidal particles which comprises the following steps:
   (A) adding a coagulant to an aqueous dispersion of primary colloidal particles which can be coagulated by addition of said coagulant, at a temperature lower than the temperature at which said colloidal primary particles begin to fuse, under such conditions that said coagulant is present in discrete coagulant units in the dispersion before said coagulant is brought into solution by diffusion;
   (B) allowing molecules of coagulant to diffuse from said coagulant units into the surrounding dispersion, thereby causing primary colloidal particles to coagulate on the surface of each coagulant unit and causing the coagulated particles to grow from inside to outside of each unit to produce coagulated particles having a desired size and comprising primary colloidal particles regularly arranged in a crystal-like structure;
   (C) separating the coagulated particles thus formed from the dispersion; and (D) drying, or heating in an aqueous phase, the coagulated particles separated above at a temperature lower than the softening point of said primary colloidal particles.

2. Method of producing spherical, high-density, coagulated colloidal particles comprising primary colloidal particles which are closely and homogeneously packed and comprising no empty space of a size larger than a primary colloidal particle, which comprises heating the dried coagulated particles obtained in claim 1 at a temperature higher than the softening point of the primary particles.

3. The method as defined in claim 1, wherein said aqueous colloidal particles are a polymer latex.

4. The method as defined in claim 3, wherein said polymer latex is a latex of a copolymer prepared by copolymerization of a monomer mixture consisting of 20 to 80 parts of acrylonitrile, 20 to 80 parts of at least one member selected from vinyl chloride, vinylidene chloride, vinyl bromide and vinylidene bromide, and 0 to 10 parts of a dyable monomer.

5. The method as defined in claim 3, wherein said polymer latex is a latex of a butadiene polymer composed of 0 to 50 weight % of styrene and 50 to 100 weight % of butadiene.

6. The method as defined in claim 5, wherein said polymer latex is a latex of a copolymer prepared by polymerizing 20 to 80 parts of a monomer mixture composed of 0 to 50 weight % of an acrylate, 0 to 100 weight % of a methacrylate, 0 to 90 weight % of an aromatic vinyl monomer, 0 to 90 weight % of a cyano vinyl monomer and 0 to 20 weight % of other copolymerizable monomer, in the presence of 20 to 80 parts of a latex of a butadiene polymer.

7. The method as defined in claim 3, wherein said polymer latex is a latex of a copolymer prepared by polymerizing 80 to 100 parts of a monomer mixture composed of 0 to 100 weight % of methyl methacrylate, 0 to 60 weight % of an acrylate or a methacrylate other than methyl methacrylate, 0 to 90 weight % of an aromatic vinyl monomer and 0 to 90 weight % of a cyano vinyl monomer, in the presence of 0 to 20 parts of a latex of an elastomer composed of 0 to 50 weight % of styrene, 50 to 100 weight % of butadiene and 0 to 30 weight % of an acrylate.

8. The method as defined in claim 3, wherein said polymer latex is a mixture of (A) 0 to 50 parts of a latex of a graft copolymer prepared by polymerizing 10 to 90 parts of at least one member selected from aromatic vinyl monomers, methacrylates, acrylates, and cyano vinyl monomers, in the presence of 10 to 90 parts of a butadiene polymer composed of 0 to 50 weight % of styrene and 50 to 100 weight % of butadiene, with (B) 50 to 100 parts of a latex of copolymer composed of 0 to 70 mol % of α-methylstyrene and 30 to 100 mol % of at least one member selected from aromatic vinyl monomers other than α-methylstyrene, methacrylates, acrylates, acrylic acid and cyano vinyl monomers.

9. The method as defined in claim 3, wherein said polymer latex is a latex of a copolymer prepared by polymerizing 15 to 95 parts of at least one member selected from methacrylates, cyano vinyl monomers, acrylates, aromatic vinyl monomers and other monomers copolymerizable therewith, in the presence of 5 to 85 parts of a latex of an elastomer composed of 40 to 100 weight % of an acrylate, 0 to 60 weight % of at least one member selected from aromatic vinyl monomers, cyano vinyl monomers, vinyl chloride, vinylidene chloride, vinyl acetate and conjugated diolefins, and 0 to 10 weight % of a cross-linkable monomer.

10. The method as defined in claim 3, wherein said polymer latex is a latex of a copolymer prepared by polymerizing 40 to 100 parts of vinylidene chloride and 0 to 60 parts of at least one member selected from aromatic vinyl monomers, cyano vinyl monomers, acrylates, methacrylates, acrylic acid, methacrylic acid, itaconic acid, maleic acid and cross-linkable monomers.

11. The method as defined in claim 3, wherein said polymer latex is a latex of a copolymer prepared by polymerizing 40 to 100 parts of vinyl chloride, 0 to 20 parts of a cyano vinyl monomer and 0 to 60 parts of at least one member selected from vinylidene chloride, vinyl bromide, acrylates, methacrylates, acrylic acid, methacrylic acid, itaconic acid, maleic acid and cross-linkable monomers.

* * * * *